US011917636B2

(12) United States Patent
Kumar (10) Patent No.: US 11,917,636 B2
(45) Date of Patent: Feb. 27, 2024

(54) DYNAMIC SELECTION OF NDDS RESOURCE IN 5G NR WITH SRS CARRIER SWITCHING

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/448,522

(22) Filed: Sep. 22, 2021

(65) Prior Publication Data

US 2023/0088631 A1    Mar. 23, 2023

(51) Int. Cl.
*H04W 72/23* (2023.01)
*H04L 5/14* (2006.01)
*H04W 76/28* (2018.01)

(52) U.S. Cl.
CPC ............... *H04W 72/23* (2023.01); *H04L 5/14* (2013.01); *H04W 76/28* (2018.02)

(58) Field of Classification Search
None
See application file for complete search history.

(56) References Cited

U.S. PATENT DOCUMENTS

2017/0265114 A1* 9/2017 Sahu ................... H04L 65/1069
2019/0014542 A1* 1/2019 Jain ..................... H04W 52/028

* cited by examiner

Primary Examiner — Clemence S Han
(74) Attorney, Agent, or Firm — Haynes and Boone, LLP (57) ABSTRACT

Various aspects of the present disclosure generally relate to wireless communication. In some aspects, a user equipment (UE) is configured such that sounding reference signal (SRS) is switched among a number of antennas on a number of carriers associated with a default data subscription (DDS). The UE is also configured to receive a signal, scheduled using discontinuous reception (DRX), and associated with a non-default data subscription using at least one of the antennas used by the DDS. The UE determines based on carrier characteristics which resource is used to receive the signal during a DRX cycle. In some aspects, the decision is based on avoiding a conflict between the SRS switching and DRX reception. In further aspects, the decision is based on selecting the carrier contributing least to downlink throughput.

30 Claims, 7 Drawing Sheets

DYNAMIC SELECTION OF NDDS RESOURCE IN 5G NR WITH SRS CARRIER SWITCHING

TECHNICAL FIELD

This application relates to wireless communication systems, and more particularly to resource selection in multi-subscriber identity module (MultiSim) devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which it is desired to use one subscription as a default data subscription (DDS) for the majority of data use, versus another non-default data subscription (nDDS). Resources may be shared between the DDS and nDDS. There is a need in the art for techniques to manage the resources used by nDDS to mitigate the impact it has on the DDS.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a multi-subscriber identity module (MSIM) user equipment (UE) comprises receiving a first configuration signal scheduling a first downlink (DL) signal on a first carrier using a first resource for a default data subscription (DDS), the first configuration signal further scheduling a second DL signal on a second carrier using a second resource for the DDS. The method further comprises receiving a signal during a DRX cycle for a non-default data subscription (nDDS) using the second resource, wherein using the second resource is based on a characteristic associated with at least one of the first and second carriers.

In an additional aspect of the disclosure, a user equipment (UE) includes a transceiver configured to receive a first configuration signal scheduling a first downlink (DL) signal on a first carrier using a first resource for a default data subscription (DDS), the first configuration signal further scheduling a second DL signal on a second carrier using a second resource for the DDS. The transceiver is further configured to receive a signal during a DRX cycle for a non-default data subscription (nDDS) using the second resource, wherein using the second resource is based on a characteristic associated with at least one of the first and second carriers.

In an additional aspect of the disclosure, a method of wireless communication performed by a multi-subscriber identity module (MSIM) user equipment (UE), includes receiving a first configuration signal scheduling a first downlink (DL) signal on a first carrier using a first resource for a default data subscription (DDS), the first configuration signal further scheduling a second DL signal on a second carrier using a second resource for the DDS; receiving a DRX configuration for a non-default data subscription (nDDS) with a time-domain conflict between SRS antenna switching and a DRX cycle on at least one of the first resource and the second resource; and transmitting a request indicating a slot delay for the first DL signal and the second DL signal based on the time-domain conflict.

In an additional aspect of the disclosure, a method of wireless communication performed by a multi-subscriber identity module (MSIM) user equipment (UE) includes receiving a first configuration signal from a base station (BS) scheduling a first downlink (DL) signal on a first carrier using a first resource for a default data subscription (DDS), the first configuration signal further scheduling a second DL signal on a second carrier using a second resource for the DDS; receiving a DRX configuration from the first BS for a non-default data subscription (nDDS) with a time-domain conflict between SRS antenna switching and a DRX cycle on at least one of the first resource and the second resource; and searching for a second BS for the nDDS based on the time-domain conflict and a characteristic of at least one of the first resource and the second resource.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-1-DMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including controls with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (MultiSim) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In the present disclosure, an operation or communication performed via a SIM may refer to an operation or communication performed for a wireless service subscription associated with the SIM (where the subscription information for the wireless service is stored).

For a multi-SIM (MSIM) device, one of the SIMs/subscriptions carries the data traffic, and it is referred to as the default data subscription (DDS) The other subscription, non-default data subscription (nDDS), is mainly used for voice and short message service (SMS). Resources may be shared between the DDS and nDDS. In some aspects, a carrier being used for DDS may be temporarily tuned away to receive a signal for the nDDS. For example, the nDDS may be configured for discontinuous reception (DRX) of a page signal.

A UE may transmit sounding reference signals (SRSs) to enable a base station (BS) to estimate a UL channel. The DDS subscription may by configured to perform SRS switching, where antennas that are used for downlink take turns being used for SRS transmission. Reception of a signal during a DRX cycle for nDDS may conflict with an SRS scheduled for the same antenna. Additionally, SRS switching may not be allowed to occur on an antenna switch when an nDDS reception is being performed on another antenna using the switch due to noise coupling between the signal paths. In implementations which avoid SRS conflicts by not transmitting the SRS, problems may arise. For example, the timing of the DRX schedule and the SRS switching schedule may align such that an antenna repeatedly drops the SRS. when an SRS is dropped repeatedly on the same antenna, a BS, due to channel reciprocity, may determine that the antenna is not suitable for DL, harming DL throughput.

According to some aspects of the present disclosure, the resources used by nDDS (antenna, antenna switch, etc.) may be dynamically selected periodically, or before each DRX reception. The selection of the resources may be determined based on characteristics of the carriers. For example, a DDS sub may be configured with two carriers, one being time division duplexed (TDD) and the other being frequency division duplexed (FDD). In some aspects, the TDD carrier is the primary component carrier (PCC) and the FDD carrier is the secondary component carrier (SCC). In some aspects, the TDD carrier is the SCC and the FDD carrier is the PCC. By default, the TDD carrier may be used for the DRX page reception. By comparing the rank of the carriers, determining SRS conflicts, hardware capability, etc., the UE may determine to perform DRX reception on the FDD carrier instead. If the FDD carrier is not capable of receiving the page, the UE may look for an alternate cell which may be used for reception.

In another example, the DDS sub is configured with two TDD carriers. The UE may determine if there is a time overlap between the page decode duration and SRS antenna switch transmission on each carrier. If there is a carrier with no time domain conflicts, that carrier may be prioritized for tune away. If all carriers have time domain conflicts, the UE may prioritize the carrier which contributes least to DL throughput. The DL throughput may be determined based on characteristics such as grant, bandwidth, rank, and SNR. While the examples above consider two carriers, the present disclosure may be applied to a greater number of carriers. As such, even if the SRS must be dropped, the impact to throughput may be mitigated.

There are a variety of benefits realized by utilizing aspects of the present disclosure. By dynamically selecting receive resources for nDDS reception, DL throughput may be preserved. The page reception may be performed on the carrier that contributes less to DL throughput, resulting in less time being used for page decode that would otherwise be used for DDS DL. Additionally, the problem of an SRS conflict occurring repeatedly on the same antenna causing the BS to not use the antenna for DL may be avoided. Thereby DL throughput may be maintained at higher levels than when using static nDDS resource selection.

Figure 1:
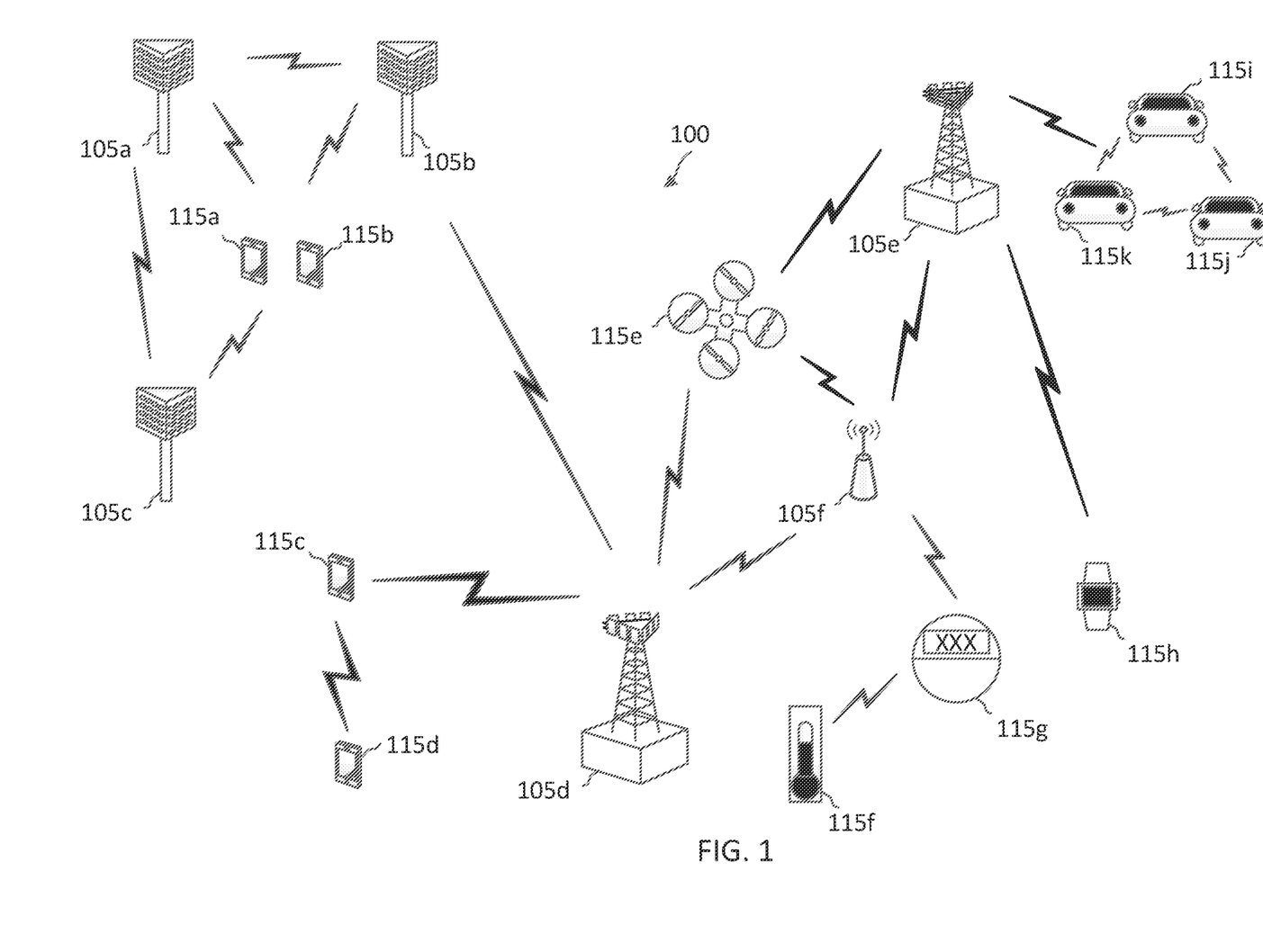
FIG. 1 illustrates a wireless communication network according to some aspects of the present disclosure.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115*e*, which may be airborne. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UEs 115 may be capable of utilizing multiple subscriber identity modules (SIMs) and may operate in a DSDS mode. UEs 115 may have multiple antennas, which may be switched such that they may be used for different things (e.g. transmit/receive). Switches may be shared among multiple antennas, and there may be multiple switches that may be interconnected such as the switches described with reference to FIG. 2. A BS 105 may communicate with a UE 115 over multiple carriers. Some carriers may be assigned to a DDS. A separate carrier may be assigned to nDDS, which may not have dedicated UE 115 resources, but rather use a DDS resource that is temporarily tuned away.

Figure 2:
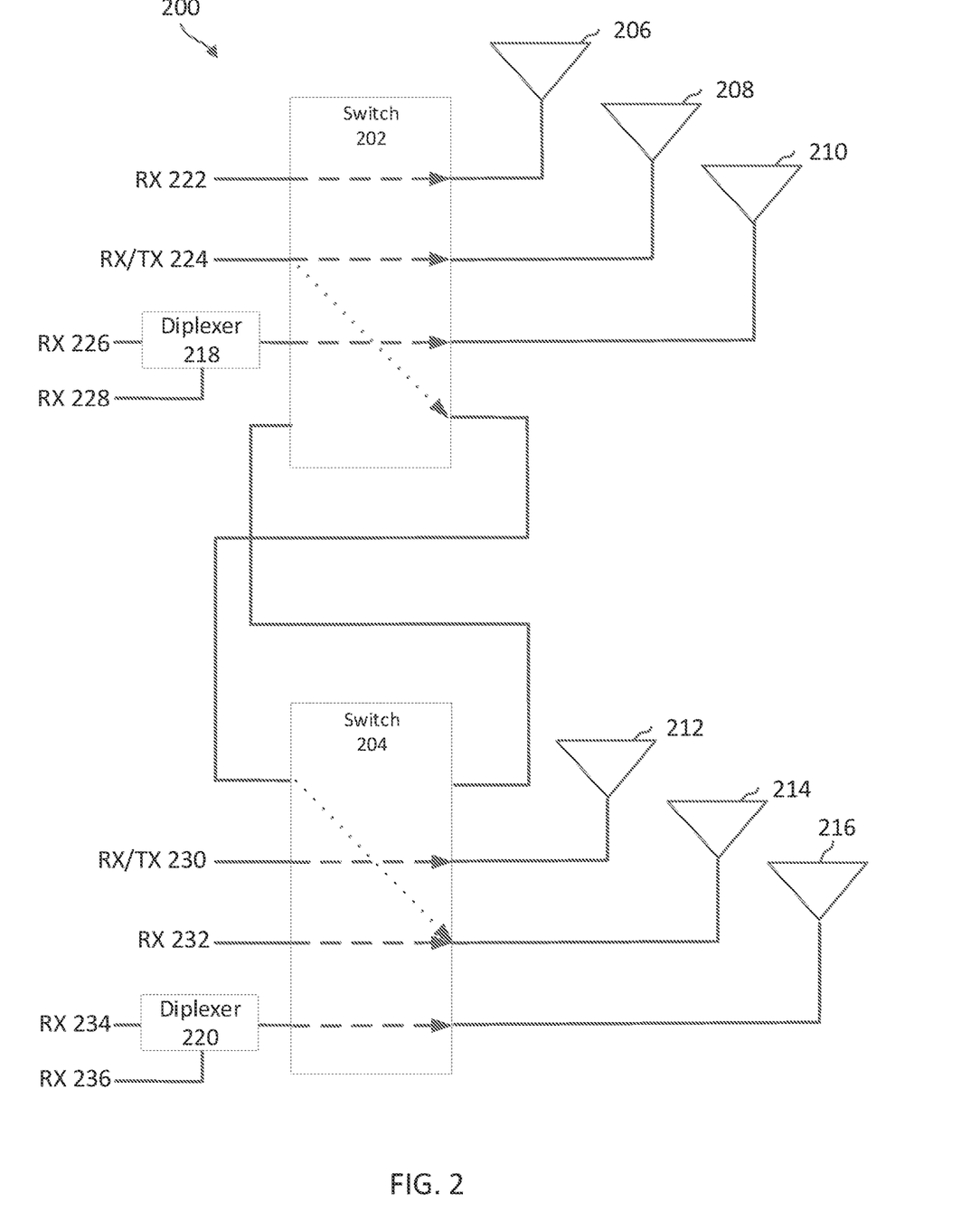
FIG. 2 illustrates a diagram of an exemplary antenna switching circuit for a UE according to some aspects of the present disclosure.

FIG. 2 illustrates a diagram of an exemplary antenna switching circuit for a UE 115 according to some aspects of the present disclosure. As illustrated the circuit includes two switches, switch 202 and switch 204, and six antennas 206, 208, 210, 212, 214, and 216. The switches may also be referred to as antenna switch modules or cross switches. A UE 115 may have antennas connected as shown in FIG. 2, or may have more or fewer antennas connected with more or fewer switches. Switches 202 and 204 allow for UE ports to be connected to different antennas at different times. For example, switch 202 is shown as being configured such that RX 222 connected to antenna 206, RX/TX 224 connected to antenna 208, and RXs 226 and 228 connected to antenna 210 through diplexer 218. Switch 204 is shown as being configured such that RX/TX 230 is connected to antenna 212, RXR 232 is connected to antenna 214, and RXs 234 and 236 are connected to antenna 216 through diplexer 220. Switches 202 and 204 may also have connections to each other such that an input to one switch may be routed to an input of the other switch. Diplexers 218 and 220 may allow a signal from an antenna to be directed to two different ports simultaneously.

The dotted arrows illustrate a connection used for SRS transmission. RX/RX 224 in some aspects may be used to transmit an SRS over different antennas at different times when configured to perform SRS switching. As illustrated, RX/TX 224 is currently routed through switch 202 to switch 204, and then routed to antenna 214.

Conflicts may occur in a number of ways which may reduce performance of the UE. For example, if the SRS transmission connection as shown is scheduled to switch at a time when antenna 214 is scheduled to receive a page signal for an nDDS, that would be a conflict as the antenna 214 may not simultaneously be used for both. There may also be limitation on using antennas connected through the same switch due to noise coupling between the transmission lines. For example, it may be a conflict if the SRS transmission connection as shown is scheduled to switch at a time when antenna 212 or antenna 216 is scheduled to receive a page signal for an nDDS. A UE may be configured to use more than one antenna at a time to receive a signal, and similarly may use more than one antenna at a time to transmit a signal.

In an example configuration, a DDS using NR is configured to use antennas 208, 210, 214, and 216. SRS transmissions are configured to switch between the same antennas 208, 210, 214, and 216. An nDDS using LTE/NR is configured to receive page signals on antennas 212 and 216. In this configuration, a UE may determine to drop the SRS signal that would transmit on antenna 5 if the SRS antenna switch time overlaps with the DRX cycle on antenna 214 or antenna 216. Dropping the SRS signal for antenna 5, however, may reduce DL performance as the UE may determine that a lack of an SRS signal indicates a poor performing signal on that antenna. Rather, the page signal reception may be dynamically configured to use an antenna which will not conflict. In this example, if the timing was such that the SRS transmission on antenna 5 was scheduled during the page DRX time, the page may be received on antenna 1 and/or antenna 3. As different antennas may be associated with different carriers, this may be accomplished by changing which carrier is used (or tuned away) for receiving the nDDS page signal. This is only one example of a determination that may be made by a UE. Other examples are discussed below which may consider other characteristics of the carriers to determine which resources are used for a nDDS.

Figure 3:
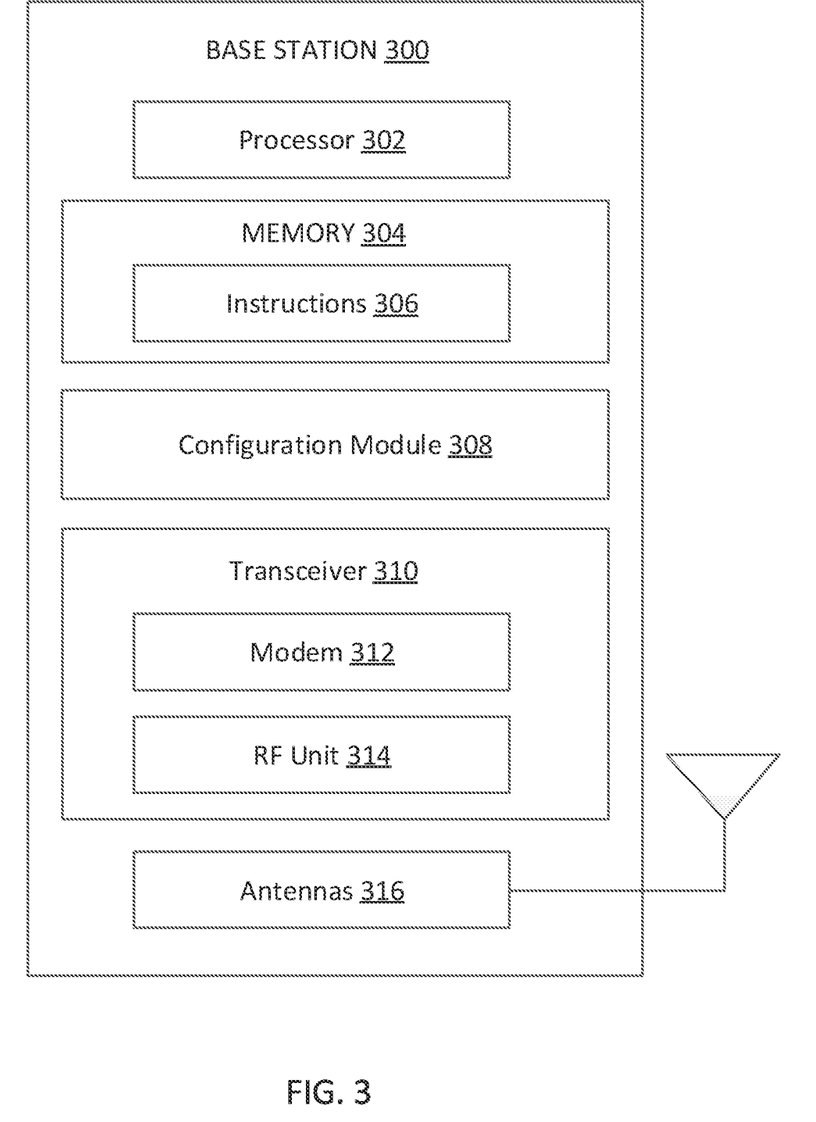
FIG. 3 illustrates a block diagram of an exemplary base station (BS) according to some aspects of the present disclosure.

FIG. 3 is a block diagram of an exemplary BS 300 according to some aspects of the present disclosure. The BS 300 may be a BS 105 as discussed in FIG. 1. As shown, the BS 300 may include a processor 302, a memory 304, a configuration module 308, a transceiver 310 including a modem subsystem 312 and a RF unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 1-2 and 5-7. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The configuration module 308 may be implemented via hardware, software, or combinations thereof. For example, the configuration module 308 may be implemented as a processor, circuit, and/or instructions 306 stored in the memory 304 and executed by the processor 302. In some examples, the configuration module 308 can be integrated within the modem subsystem 312. For example, the configuration module 308 can be implemented by a combination of software components (e.g., executed by a DSP or a general processor) and hardware components (e.g., logic gates and circuitry) within the modem subsystem 312. The configuration module 308 may communicate with one or more components of BS 300 to implement various aspects of the present disclosure, for example, aspects of FIGS. 1-2 and 5-7.

The configuration module 308 may configure a UE 115 with a set of carriers. For example, the configuration module 308 may configure a UE 115 to have a TDD carrier and a FDD carrier for use by a DDS. The configuration module 308 may also configure two TDD carriers, two FDD carriers, or a larger number of carriers. The configuration module 308 may also configure the UE 115 to transmit SRSs, and may configure the UE 115 to perform SRS switching. The configuration module 308 may also configure the UE for discontinuous reception (DRX) of a paging signal. The page decode may be scheduled for a periodic basis.

As shown, the transceiver 310 may include the modem subsystem 312 and the RF unit 314. The transceiver 310 can be configured to communicate bi-directionally with other devices, such as the UEs 115, 215 and/or BS 300 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., RRC configurations, MIB, PDSCH data and/or PDCCH DCIs, SRSs, paging signals, etc.) from the modem subsystem 312 (on outbound transmissions) or of transmissions originating from another source such as a UE 115 and/or UE 400. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices and provide the received data messages for processing and/or demodulation at the transceiver 310. The transceiver 310 may provide the demodulated and decoded data (e.g., PUSCH data, PUCCH UCI, page data, etc.) to the configuration module 308 for processing. The antennas 316 may include multiple antennas of similar or different designs in order to sustain multiple transmission links.

In an aspect, the BS 300 can include multiple transceivers 310 implementing different RATs (e.g., NR and LTE). In an aspect, the BS 300 can include a single transceiver 310 implementing multiple RATs (e.g., NR and LTE). In an aspect, the transceiver 310 can include various components, where different combinations of components can implement different RATs.

Figure 4:
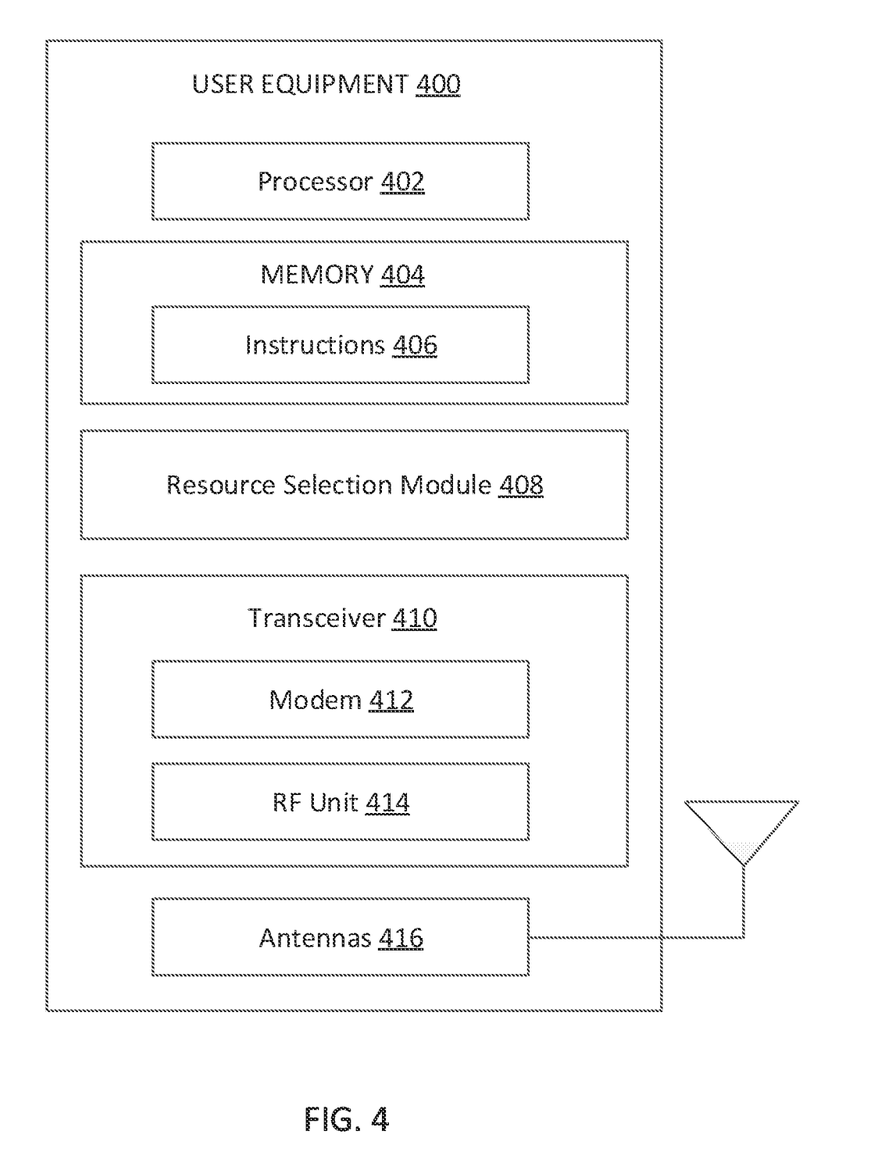
FIG. 4 illustrates a block diagram of an exemplary user equipment (UE) according to some aspects of the present disclosure.

FIG. 4 is a block diagram of an exemplary UE 400 according to some aspects of the present disclosure. The UE 400 may be a UE 115 as discussed above in FIG. 1. As shown, the UE 400 may include a processor 402, a memory 404, a resource selection module 408, a transceiver 410 including a modem subsystem 412 and a radio frequency (RF) unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to a UE 115 in connection with aspects of the present disclosure, for example, aspects of FIGS. 1-2 and 5-7. Instructions 406 may also be referred to as code, which may include any type of computer-readable statements.

The resource selection module 408 may be implemented via hardware, software, or combinations thereof. For example, the resource selection module 408 may be implemented as a processor, circuit, and/or instructions 406 stored in the memory 404 and executed by the processor 402.

In some aspects, the resource selection module 408 may include multiple SIMs or SIM cards (e.g., 2, 3, 4, or more). Each SIM may be configured to store information used for accessing a network, for example, to authenticate and identify the UE 400 as a subscriber of the network. Some examples of information stored on a SIM may include, but not limited to, a subscriber identity such as an international mobile subscriber identity (IMSI) and/or information and/or key used to identify and authenticate the UE 400 in a certain provider network. In some aspects, the UE 400 may have a first subscription on a first SIM of the multiple SIMs and a second subscription on a second SIM of the multiple SIMs. The first subscription may identify the UE 400 by a first subscriber identity, and the second subscription may identify the UE 400 by a second subscriber identity. One of the SIMs may be the default data subscription (DDS) and the others the non-default data subscriptions (nDDS).

The resource selection module 408 may be configured to select which resources are used for the nDDS. The selection of resources may be done dynamically as discussed with reference to FIGS. 2 and 5-7. To facilitate making the selection, the resource selection module 408 may determine characteristics of carriers. For example, the resource selection module 408 may determine the rank of the carriers, the DL throughput of the carriers, SRS switching timing and resources, and DRX timing. In some aspects, the resource selection module 408 may determine to use a certain carrier for DRX reception based on avoiding a time domain conflict, and/or to reduce the impact to DL throughput.

As shown, the transceiver 410 may include the modem subsystem 412 and the RF unit 414. The transceiver 410 can be configured to communicate bi-directionally with other devices, such as the BSs 105 and 500. The modem 412 may be configured to include the logic portions discussed at FIG. 3 and to perform the actions with respect to FIGS. 1-2 and 5-7.

The modem subsystem 412 may be configured to modulate and/or encode the data from the memory 404, the resource selection module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUSCH data, PUCCH UCI, page data, etc.) or of transmissions originating from another source such as a UE 115, a BS 105, or an anchor. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 400 to enable the UE 400 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., RRC configurations, MIB, PDSCH data and/or PDCCH DCIs, etc.) to the resource selection module 408 for processing. The antennas 416 may include multiple antennas of similar or different designs in order to sustain multiple transmission links. Antennas may be switched as discussed with reference to FIG. 2, or other similar configurations.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
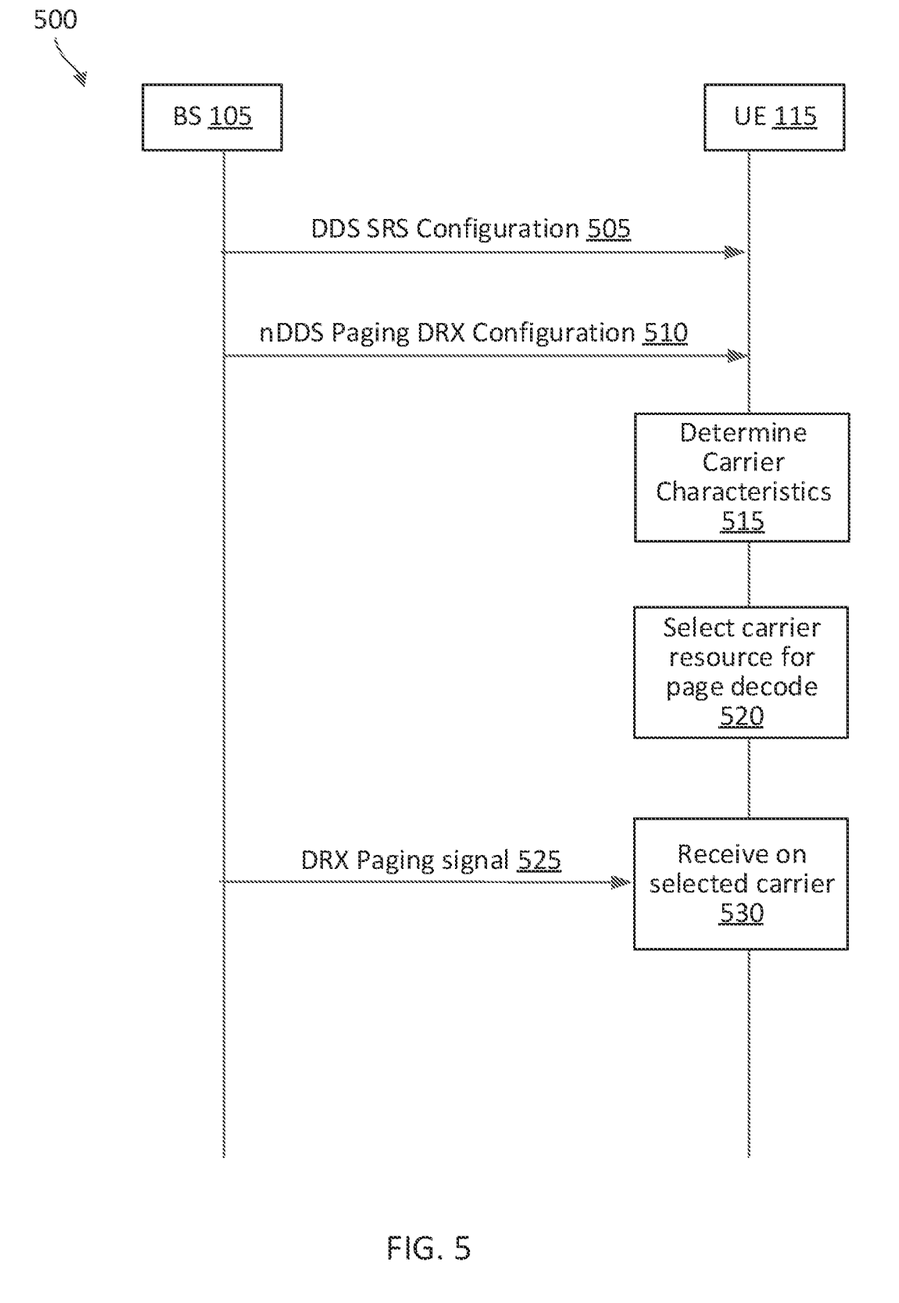
FIG. 5 illustrates an exemplary communication protocol diagram according to some aspects of the present disclosure.

FIG. 5 illustrates an exemplary communication protocol diagram 500 according to some aspects of the present disclosure. Aspects of the communication protocol diagram 500 may be performed by wireless networks, such as the network 100. In this regard, a BS 105 and UE 115 may perform functions of the communication protocol diagram 500. In some instances, the BS 105 may utilize TRPs (e.g., the TRPs 205) to communicate with the UE 115. In some aspects, the BS 105 may utilize one or more components, such as the processor 302, the memory 304, the configuration module 308, the transceiver 310, the modem 312, and the one or more antennas 316 shown in FIG. 3, and the UE 115 may utilize one or more components, such as the processor 402, the memory 404, the resource selection module 408, the transceiver 410, the modem 412, and the one or more antennas 416 shown in FIG. 4. As illustrated, the method 500 includes a number of enumerated actions, but aspects of the FIG. 5 may include additional actions before, after, and in between the enumerated actions. In some aspects, one or more of the enumerated actions may be omitted or performed in a different order.

At action 505, the BS 105 transmits a DDS SRS configuration to the UE 115. The configuration may be an RRC configuration. The configuration may indicate to the UE 115 to perform SRS switching, either by SRS carrier switching (SRS CS) or SRS antenna switching. In general, when an antenna is used for DL, it will also be configured for SRS so that the BS 105 may use the SRS signal to help characterize the TDD DL channel through reciprocity.

At action 510, the BS 105 transmits a nDDS paging DRX configuration to the UE 115. DRX allows the UE 115 to ignore the channel until a monitoring occasion, at which time a resource may monitor the indicated channel. The configuration may indicate a periodicity by which the DRX cycle repeats so that the UE 115 knows when to monitor for the page signal.

At action 515, the UE 115 determines carrier characteristics. Characteristics may include, for example, grants, bandwidth, rank, SNR, SRS timing and resources, and DRX timing.

At action 520, the UE 115 selects a carrier resource for page decode. This determination may be made based on the carrier characteristics. For example, the UE 115 may select the resource that does not have an SRS conflict, or contributes the least to DL throughput. In some instances, the UE 115 may determine to search for a new cell so that it may receive using resources which may not be used on the current cell. Other examples of selection criteria are discussed with reference to FIGS. 6 and 7.

In some aspects, the UE can send a request to the network to alter the SRS schedule to avoid the time domain conflict with nDDS. In this case, UE can indicate a slot offset to be added to the conflicting SRS resource ID.

At action 525, the BS 105 transmits a DRX paging signal.

At action 530, the UE 115 receives the DRX paging signal on the selected carrier. When a UE 115 receives the DRX paging signal on a certain carrier, the receive resources associated with that carrier are tuned away to the carrier configured for the nDDS temporarily. During that time the carrier may not be available for DDS transmit or receive.

Figure 6:
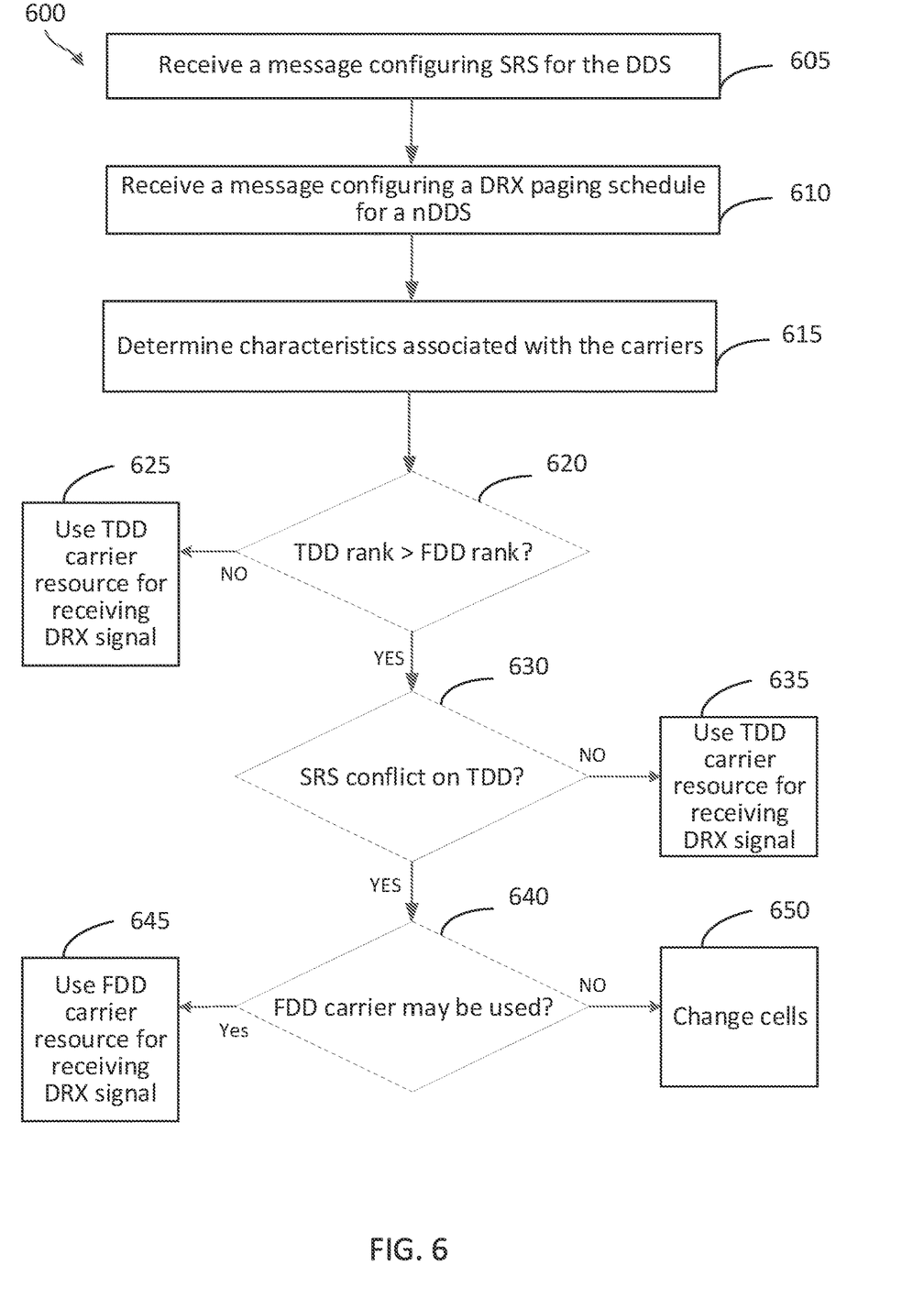
FIG. 6 illustrates a diagram of an exemplary method performed by a UE according to some aspects of the present disclosure.

FIG. 6 is a flowchart of a method 600 according to some aspects of the present disclosure. The method 600 may be performed by a UE, such as a UE 115 or 400. The UE 115 of FIG. 6 may be configured with a TDD carrier and a FDD carrier for a DDS. As illustrated, the method 600 includes a number of enumerated actions, but aspects of the method 600 may include additional actions before, after, and in between the enumerated actions. In some aspects, one or more of the enumerated actions may be omitted or performed in a different order.

At block 605, the UE 115 receives a message configuring SRS for the DDS. The configuration may be an RRC configuration. The configuration may indicate to the UE 115 to perform SRS switching, either by SRS carrier switching (SRS CS) or SRS antenna switching. In general, when an antenna is used for DL, it will also be configured for SRS so that the BS 105 may use the SRS signal to help characterize the TDD DL channel through reciprocity.

At block 610, the UE 115 receives a message configuring a DRX paging schedule for the nDDS. DRX allows the UE 115 to ignore the channel until a monitoring occasion, at which time a resource may monitor the indicated channel. The configuration may indicate a periodicity by which the DRX cycle repeats so that the UE 115 knows when to monitor for the page signal.

At block 615, the UE 115 determines characteristics associated with the carriers. Characteristics may include, for example, grants, bandwidth, rank, SNR, SRS timing and resources, and DRX timing.

At decision block 620, the UE 115 determines whether the TDD carrier is a higher rank than the FDD carrier. If the TDD carrier is lower rank than the FDD carrier, the method continues to block 625 where the UE 115 uses the TDD carrier resources to receive the DRX paging signal. If the TDD carrier is higher rank than the FDD carrier, the method continues to decision block 630. In some aspects, rather than determine their ranks explicitly, it is assumed by the UE 115 that TDD is higher rank, as this is commonly the case. In addition to comparing rank, in some aspects the UE 115 may consider other characteristics which may indicate a difference in DL throughput on each carrier such as grants, bandwidth, and SNR.

At decision block 630, the UE 115 determines whether there is an SRS conflict on the TDD carrier. If there is no conflict on the TDD carrier, the method continues to block 635 where the UE 115 uses the TDD carrier to receive the DRX paging signal. If there is a conflict, the method continues to decision block 640. In some aspects, a conflict may arise when SRS is scheduled for the same resource at the same time as the signal during a DRX cycle. In other aspects, a conflict may arise when SRS is scheduled to switch during a DRX reception on an antenna that is connected to the same switch. The UE 115 may first determine whether SRS switching is configured on the TDD carrier to confirm if the SRS would be used by the BS 105 for characterizing the DL channel SRS may be used by a BS for example for DL channel state information (CSI) acquisition. The UE 115 may further determine whether the SRS would be suspended due to a conflict which can result in a DL rank reduction. The UE 115 may continue to use the TDD carrier for nDDS DRX if there is no need to suspend SRS due to a conflict which can result in DL rank reduction.

At decision block 640, the UE 115 determines whether the FDD carrier has the hardware capability to be used for receiving the paging signal. For example, the receive resources associated with the FDD carrier may be incapable of tuning to the nDDS carrier. If the FDD carrier may be used, the method continues to block 645 where the FDD carrier resource is used for receiving the nDDS DRX paging signal. If the FDD carrier may not be used, then the method continues to block 650.

At block 650, the UE 115 looks for alternate cells on different bands satisfying S criterion where the nDDS may be reselected to. The alternate cell may be colocated with the originally used cell, but with a different physical cell identifier (PCI).

Figure 7:
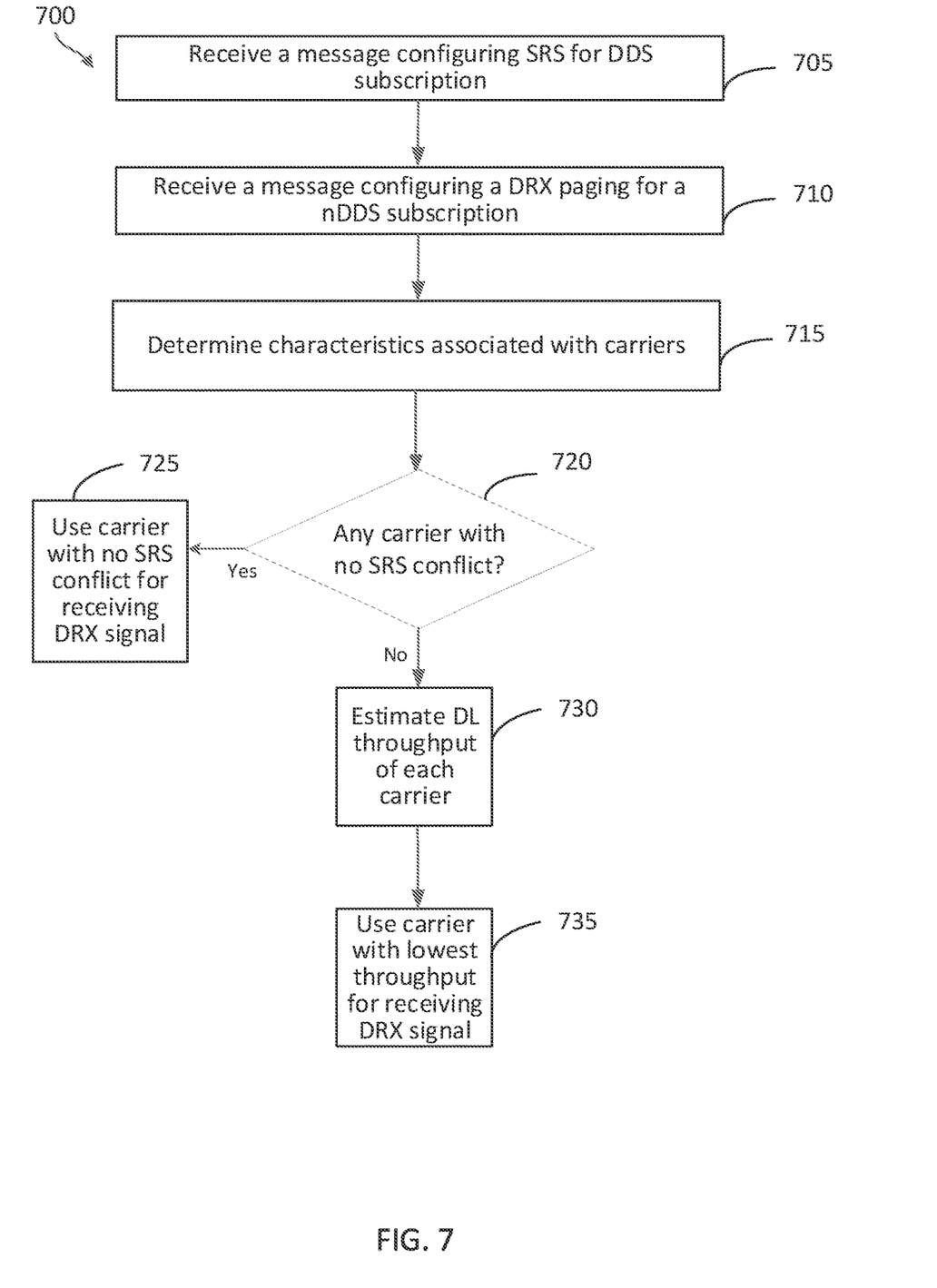
FIG. 7 illustrates a diagram of an exemplary method performed by a UE according to some aspects of the present disclosure.

FIG. 7 is a flowchart of a method 700 according to some aspects of the present disclosure. The method 700 may be performed by a UE, such as a UE 115 or 400. The UE 115 of FIG. 7 may be configured with two TDD carriers for a DDS. As illustrated, the method 700 includes a number of enumerated actions, but aspects of the method 700 may include additional actions before, after, and in between the enumerated actions. In some aspects, one or more of the enumerated actions may be omitted or performed in a different order.

At block 705, the UE 115 receives a message configuring SRS for the DDS. The message may be an RRC configuration. The message may indicate to the UE 115 to perform SRS switching, either by SRS carrier switching (SRS CS) or SRS antenna switching. In general, when an antenna is used for DL, it will also be configured for SRS so that the BS 105 may use the SRS signal to help characterize the TDD DL channel through reciprocity.

At block 710, the UE 115 receives a message configuring a DRX paging schedule for the nDDS. DRX allows the UE 115 to ignore the channel until a monitoring occasion, at which time a resource may monitor the indicated channel. The configuration may indicate a periodicity by which the DRX cycle repeats so that the UE 115 knows when to monitor for the page signal.

At block 715, the UE 115 determines characteristics associated with the carriers. Characteristics may include, for example, grants, bandwidth, rank, SNR, SRS timing and resources, and DRX timing.

At decision block 720, the UE 115 determines whether any of the DDS carriers have a time-domain conflict between SRS and nDDS DRX page reception. If there is a carrier with no conflict, then the method continues to block 725 where the UE 115 uses the carrier without a conflict for the nDDS DRX page reception. If all of the carriers have a time domain conflict, then the method continues to block 730. In some aspects, a conflict may arise when SRS is scheduled for the same resource at the same time as the signal during a DRX cycle. In other aspects, a conflict may arise when SRS is scheduled to switch during a DRX reception on an antenna that is connected to the same switch. The UE 115 may first determine whether SRS switching is configured on the TDD carrier to confirm if the SRS would be used by the BS 105 for characterizing the DL channel SRS may be used by a BS for example for DL channel state information (CSI) acquisition. The UE 115 may further determine whether the SRS would be suspended due to a conflict which can result in a DL rank reduction. The UE 115 may continue to use the TDD carrier for nDDS DRX if there is no need to suspend SRS due to a conflict which can result in DL rank reduction.

At block 730, the UE 115 estimates the effective DL throughput for each carrier. The effective DL throughput may be determined based on, for example, one or more of grants, bandwidth, rank, and SNR.

At block 735, the UE 115 selects the carrier with the lowest throughput to be used for nDDS DRX page reception. Thereby the impact to DL throughput is mitigated as the interruption to DL time is on the resource which is contributing less to DL throughput.

Further aspects of the present disclosure include the following clauses:

1. A method of wireless communication performed by a multi-subscriber identity module (MSIM) user equipment (UE), the method comprising:
receiving a first configuration signal scheduling a first downlink (DL) signal on a first carrier using a first resource for a default data subscription (DDS), the first configuration signal further scheduling a second DL signal on a second carrier using a second resource for the DDS; and
receiving a signal during a first DRX cycle for a non-default data subscription (nDDS) using the second resource;
wherein using the second resource is based on a characteristic associated with at least one of the first and second carriers; and
wherein the characteristic comprises the first resource being configured for SRS antenna switching.

2. The method of clause 1 further comprising:
receiving a subsequent signal during a second DRX cycle using the first resource;
wherein using the first resource is based on a second characteristic associated with at least one of the first and second carriers.

3. The method of any of clauses 1-2, wherein the first carrier is configured for time domain duplexing (TDD) and the second carrier is configured for frequency domain duplexing (FDD).

4. The method of any of clauses 1-2, wherein the first carrier and the second carrier are configured for time domain duplexing (TDD).

5. The method of any of clauses 1-4, wherein the characteristic comprises the second carrier contributing less to downlink throughput than the first carrier.

6. The method of any of clauses 1-5, wherein the characteristic comprises a rank of at least one of the first and second carriers.

7. The method of any of clauses 1-2 or 5-6, wherein the first carrier and the second carrier are configured for frequency domain duplexing (FDD).

8. The method of any of clauses 1-7, wherein the characteristic comprises a time-domain conflict between SRS switching and receiving the signal during the first DRX cycle on at least one of the first resource and the second resource.

9. The method of clause 8, wherein the time-domain conflict comprises receiving the signal during the first DRX cycle on a first antenna connected to a switch, wherein the switch is connected to a second antenna which is scheduled to be switched to be used for SRS transmission at a time overlapping the signal during the first DRX cycle.

10. The method of any of clauses 1-9, wherein the characteristic comprises a bandwidth of at least one of the first and second carriers.

11. The method of any of clauses 1-10, wherein the characteristic comprises a signal to noise ratio (SNR) associated with at least one of the first and second carriers.

12. A user equipment (UE) comprising:
A transceiver configured to:
receive a first configuration signal scheduling a first downlink (DL) signal on a first carrier using a first resource for a default data subscription (DDS), the first configuration signal further scheduling a second DL signal on a second carrier using a second resource for the DDS; and
receive a signal during a first DRX cycle for a non-default data subscription (nDDS) using the second resource;
wherein using the second resource is based on a characteristic associated with at least one of the first and second carriers; and
wherein the characteristic comprises the first resource being configured for SRS antenna switching.

13. The UE of clause 12 wherein the transceiver is further configured to:
receive a subsequent signal during a second DRX cycle using the first resource;
wherein using the first resource is based on a second characteristic associated with at least one of the first and second carriers.

14. The UE of any of clauses 12-13, wherein the first carrier is configured for time domain duplexing (TDD) and the second carrier is configured for frequency domain duplexing (FDD).

15. The UE of any of clauses 12-13, wherein the first carrier and the second carrier are configured for time domain duplexing (TDD).

16. The UE of any of clauses 12-15, wherein the characteristic comprises the second carrier contributing less to downlink throughput than the first carrier.

17. The UE of any of clauses 12-16, wherein the characteristic comprises a rank of at least one of the first and second carriers.

18. The UE of any of clauses 12-13 or 16-17, wherein the first carrier and the second carrier are configured for frequency domain duplexing (FDD).

19. The UE of any of clauses 12-18, wherein the characteristic comprises a time-domain conflict between SRS switching and receiving the signal during the first DRX cycle on at least one of the first resource and the second resource.

20. The UE of clause 19, wherein the time-domain conflict comprises receiving the signal during the first DRX cycle on a first antenna connected to a switch, wherein the switch is connected to a second antenna which is scheduled to be switched to be used for SRS transmission at a time overlapping the signal during the first DRX cycle.

21. The UE of any of clauses 12-20, wherein the characteristic comprises a bandwidth of at least one of the first and second carriers.

22. The UE of any of clauses 12-21, wherein the characteristic comprises a signal to noise ratio (SNR) associated with at least one of the first and second carriers.

23. A method of wireless communication performed by a multi-subscriber identity module (MSIM) user equipment (UE), the method comprising:
receiving a first configuration signal scheduling a first downlink (DL) signal on a first carrier using a first resource for a default data subscription (DDS), the first configuration signal further scheduling a second DL signal on a second carrier using a second resource for the DDS;

receiving a DRX configuration for a non-default data subscription (nDDS) with a time-domain conflict between SRS antenna switching and a DRX cycle on at least one of the first resource and the second resource; and transmitting a request indicating a slot delay for the first DL signal and the second DL signal based on the time-domain conflict.

24. The method of clause 23, wherein the time-domain conflict comprises receiving the signal during the DRX cycle on a first antenna connected to a switch, wherein the switch is connected to a second antenna which is scheduled to be switched for SRS transmission at a time overlapping the DRX cycle.

25. The method of any of clauses 23-4, wherein the transmitting comprises indicating a slot offset.

26. The method of clause 25, wherein the slot offset is associated with a SRS resource ID.

27. A method of wireless communication performed by a multi-subscriber identity module (MSIM) user equipment (UE), the method comprising:

receiving a first configuration signal from a base station (BS) scheduling a first downlink (DL) signal on a first carrier using a first resource for a default data subscription (DDS), the first configuration signal further scheduling a second DL signal on a second carrier using a second resource for the DDS;

receiving a DRX configuration from the first BS for a non-default data subscription (nDDS) with a time-domain conflict between SRS antenna switching and a DRX cycle on at least one of the first resource and the second resource; and searching for a second BS for the nDDS based on the time-domain conflict and a characteristic of at least one of the first resource and the second resource.

28. The method of clause 27, further comprising:

Receiving a signal during a DRX cycle from the second BS.

29. The method of any of clauses 27-28, wherein the characteristic comprises a hardware capability which is incompatible with a frequency band of the nDDS.

30. The method of any of clauses 27-29, wherein the first carrier is configured for time domain duplexing (TDD) and the second carrier is configured for frequency domain duplexing (FDD).

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a multi-subscriber identity module (MSIM) user equipment (UE), the method comprising:
    receiving a first configuration signal scheduling a first downlink (DL) signal on a first carrier using a first resource for a default data subscription (DDS), the first configuration signal further scheduling a second DL signal on a second carrier using a second resource for the DDS; and
    receiving a signal during a first DRX cycle for a non-default data subscription (nDDS) using the second resource;
    wherein using the second resource is based on a characteristic associated with at least one of the first and second carriers; and
    wherein the characteristic comprises the first resource being configured for SRS antenna switching.

2. The method of claim 1 further comprising:
    receiving a subsequent signal during a second DRX cycle using the first resource;
    wherein using the first resource is based on a second characteristic associated with at least one of the first and second carriers.

3. The method of claim 1, wherein the first carrier is configured for time domain duplexing (TDD) and the second carrier is configured for frequency domain duplexing (FDD).

4. The method of claim 1, wherein the first carrier and the second carrier are configured for time domain duplexing (TDD).

5. The method of claim 1, wherein the characteristic comprises the second carrier contributing less to downlink throughput than the first carrier.

6. The method of claim 1, wherein the characteristic comprises a rank of at least one of the first and second carriers.

7. The method of claim 1, wherein the first carrier and the second carrier are configured for frequency domain duplexing (FDD).

8. The method of claim 1, wherein the characteristic comprises a time-domain conflict between SRS switching and receiving the signal during the first DRX cycle on at least one of the first resource and the second resource.

9. The method of claim 8, wherein the time-domain conflict comprises receiving the signal during the first DRX cycle on a first antenna connected to a switch, wherein the switch is connected to a second antenna which is scheduled to be switched to be used for SRS transmission at a time overlapping the signal during the first DRX cycle.

10. The method of claim 1, wherein the characteristic comprises a bandwidth of at least one of the first and second carriers.

11. The method of claim 1, wherein the characteristic comprises a signal to noise ratio (SNR) associated with at least one of the first and second carriers.

12. A user equipment (UE) comprising:
A transceiver configured to:
receive a first configuration signal scheduling a first downlink (DL) signal on a first carrier using a first resource for a default data subscription (DDS), the first configuration signal further scheduling a second DL signal on a second carrier using a second resource for the DDS; and
receive a signal during a first DRX cycle for a non-default data subscription (nDDS) using the second resource;
wherein using the second resource is based on a characteristic associated with at least one of the first and second carriers; and
wherein the characteristic comprises the first resource being configured for SRS antenna switching.

13. The UE of claim 12 wherein the transceiver is further configured to:
receive a subsequent signal during a second DRX cycle using the first resource;
wherein using the first resource is based on a second characteristic associated with at least one of the first and second carriers.

14. The UE of claim 12, wherein the first carrier is configured for time domain duplexing (TDD) and the second carrier is configured for frequency domain duplexing (FDD).

15. The UE of claim 12, wherein the first carrier and the second carrier are configured for time domain duplexing (TDD).

16. The UE of claim 12, wherein the characteristic comprises the second carrier contributing less to downlink throughput than the first carrier.

17. The UE of claim 12, wherein the characteristic comprises a rank of at least one of the first and second carriers.

18. The UE of claim 12, wherein the first carrier and the second carrier are configured for frequency domain duplexing (FDD).

19. The UE of claim 12, wherein the characteristic comprises a time-domain conflict between SRS switching and receiving the signal during the first DRX cycle on at least one of the first resource and the second resource.

20. The UE of claim 19, wherein the time-domain conflict comprises receiving the signal during the first DRX cycle on a first antenna connected to a switch, wherein the switch is connected to a second antenna which is scheduled to be switched to be used for SRS transmission at a time overlapping the signal during the first DRX cycle.

21. The UE of claim 12, wherein the characteristic comprises a bandwidth of at least one of the first and second carriers.

22. The UE of claim 12, wherein the characteristic comprises a signal to noise ratio (SNR) associated with at least one of the first and second carriers.

23. A method of wireless communication performed by a multi-subscriber identity module (MSIM) user equipment (UE), the method comprising:
receiving a first configuration signal scheduling a first downlink (DL) signal on a first carrier using a first resource for a default data subscription (DDS), the first configuration signal further scheduling a second DL signal on a second carrier using a second resource for the DDS;
receiving a DRX configuration for a non-default data subscription (nDDS) with a time-domain conflict between SRS antenna switching and a DRX cycle on at least one of the first resource and the second resource; and
transmitting a request indicating a delay for the first DL signal and the second DL signal based on the time-domain conflict.

24. The method of claim 23, wherein the time-domain conflict comprises receiving the signal during the DRX cycle on a first antenna connected to a switch, wherein the switch is connected to a second antenna which is scheduled to be switched for SRS transmission at a time overlapping the DRX cycle.

25. The method of claim 23, wherein the delay comprises a slot offset.

26. The method of claim 25, wherein the slot offset is associated with a SRS resource ID.

27. A method of wireless communication performed by a multi-subscriber identity module (MSIM) user equipment (UE), the method comprising:
receiving a first configuration signal from a base station (BS) scheduling a first downlink (DL) signal on a first carrier using a first resource for a default data subscription (DDS), the first configuration signal further scheduling a second DL signal on a second carrier using a second resource for the DDS;
receiving a DRX configuration from the first BS for a non-default data subscription (nDDS) with a time-domain conflict between SRS antenna switching and a DRX cycle on at least one of the first resource and the second resource; and
searching for a second BS for the nDDS based on the time-domain conflict and a characteristic of at least one of the first resource and the second resource.

28. The method of claim 27, further comprising:
Receiving a signal during a DRX cycle from the second BS.

29. The method of claim 27, wherein the characteristic comprises a hardware capability which is incompatible with a frequency band of the nDDS.

30. The method of claim 27, wherein the first carrier is configured for time domain duplexing (TDD) and the second carrier is configured for frequency domain duplexing (FDD).

* * * * *